3,487,684
PRECIPITATION MEASUREMENT GAUGE
Duane G. Chadwick, Logan, Utah, assignor to Thiokol Chemical Corporation, Bristol, Pa., a corporation of Pennsylvania
Continuation-in-part of application Ser. No. 466,404, June 23, 1965. This application Dec. 18, 1967, Ser. No. 691,263
Int. Cl. G01w 1/14; G01f 23/00
U.S. Cl. 73—171    5 Claims

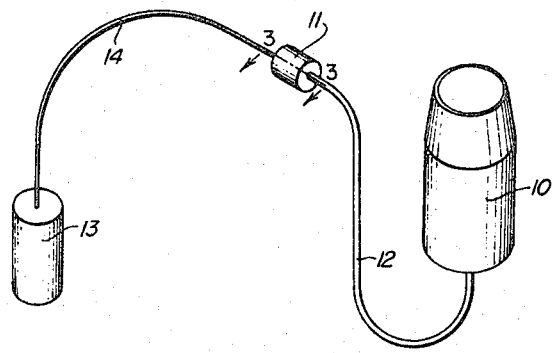
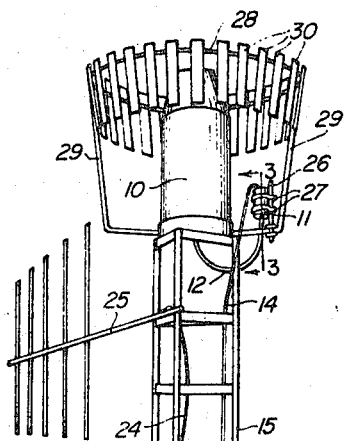
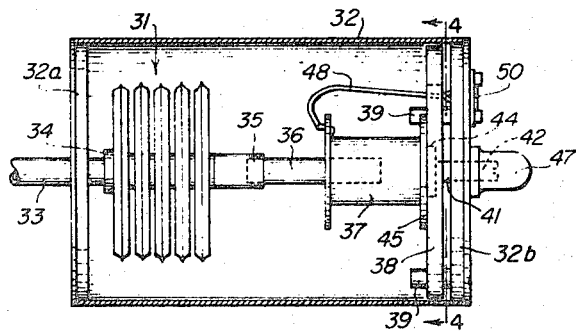
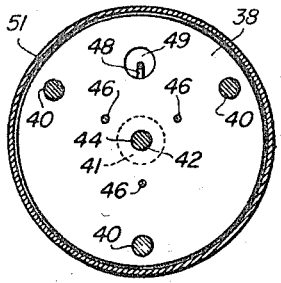
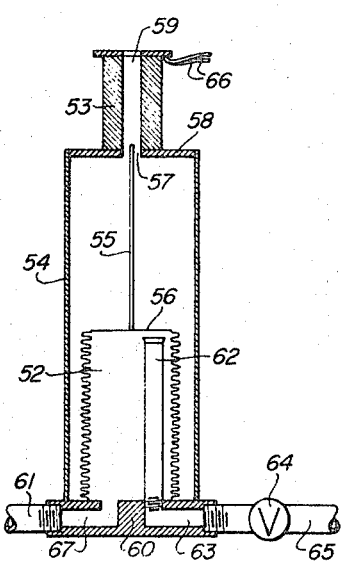
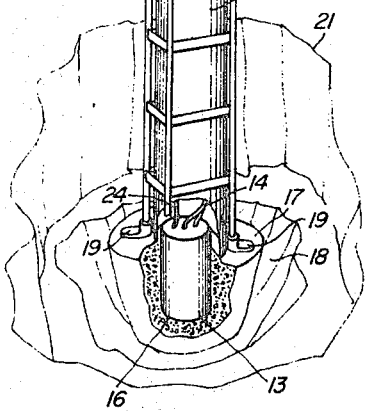
Jan. 6, 1970     D. G. CHADWICK     3,487,684
PRECIPITATION MEASUREMENT GAUGE
Filed Dec. 18, 1967
INVENTOR.
DUANE G. CHADWICK
ATTORNEYS United States Patent Office 3,487,684
Patented Jan. 6, 1970

ABSTRACT OF THE DISCLOSURE

A precipitation measurement device for monitoring the degree of precipitation in isolated areas. The device includes a precipitation-receiving vessel, a hydraulic-pressure-responsive means connected to the vessel to respond to changes in the hydraulic pressure of precipitation received by the vessel, and a signalling means connected to the pressure responsive means. In the preferred form, a magnetic core carried by a hydraulic bellows moves in and out of a stationary electric coil in proportion to the hydraulic pressure of the precipitation received by the vessel. Means are provided in circuit with the coil to record or transmit signals in accordance with the position of the core in the coil.

RELATED APPLICATIONS

This application is a continuation-in-part of copending application Ser. No. 466,404, filed June 23, 1965, now Patent No. 3,372,586 dated Mar. 12, 1968. The parent application describes and claims a precipitation gauge which includes a weighing scale as a pressure-responsive means mounted to support a precipitation-receiving vessel. The present application describes and claims an improved gauge which is supportable independently of the pressure-responsive means. A hydraulic bellows is employed in place of the scales disclosed in the parent application.

BACKGROUND OF THE INVENTION

Field

This invention relates to weather monitoring systems. In particular it is directed to the monitoring of precipitation at isolated or inaccessible regions and provides an improved precipitation gauge for that purpose.

State of the art

Gauges heretofore used in mountainous or other inaccessible terrain to measure precipitation accumulated over a period of time have required an observer to travel to the gauge periodically to make a reading. Accordingly, readings have been infrequent and much valuable data concerning precipitation during a specific period have gone unrecorded. To overcome this deficiency, a gauge capable of transmitting accurate information on a continuous basis or at frequent intervals has been needed. Although it has been previously suggested to transmit weather information, via radio signal, there has remained a need for a suitable device capable of providing accurate input information to a radio transmitter concerning rainfall or other forms of precipitation. Previous suggestions concerning precipitation gauges have involved various mechanical means for measuring the weight of precipitation accumulating in a precipitation-receiving vessel. Such devices depend upon scales of one type or another and involve springs or comparable weight-responsive means. Such devices are susceptible to inaccuracies due to the effect of changing weather conditions on the working parts. Natural forces, such as wind pushing on the receiving vessel or its support structure, introduce errors into the readings. To minimize such inaccuracies, complex or delicate stabilizing means have been required.

SUMMARY OF THE INVENTION

The present invention provides a mechanically simple gauge with many advantages over the prior art instruments.

The input information delivered by the claimed gauge to a transmitter or other device is unaffected by changing weather or the normal forces of nature acting on the collection vessel or its support structure. The system of the present invention comprises a precipitation-receiving vessel; a hydraulic-pressure-responsive means connected to the vessel to respond proportionately to changes in the hydraulic pressure within the vessel; a magnetic core mounted for in and out movement with respect to a coil proportionately to the responses of the hydraulic-pressure-responsive means; and indicating (monitoring, transmitting or recording) means in circuit with the coil and proportionately responsive to the position of the core within the coil. Although either the core or the coil may be stationary while the other member moves in accordance with movements of the hydraulic-pressure-responsive means, it is generally most convenient to mount the coil in a stationary position with respect to the pressure-responsive means. The magnetic core is then carried by the pressure-responsive means longitudinally into and out of the coil as the pressure-responsive means responds to changes in pressure in the vessel.

The hydraulic-pressure-responsive means of this invention are mounted in non-supporting relationship to the precipitation collection vessel. Accordingly, the random or periodic signals from the transmitter (or equivalent device), which are frequently experienced by the prior art as a result of wind or other natural forces unrelated to precipitation, are eliminated. The claimed precipitation gauge reports only fluctuations in fluid pressure within the precipitation-receiving vessel and is not responsive to the effects of wind or objects striking or leaning on the receiving vessel.

The entire pressure-responsive means and any desired auxiliary equipment may be housed within a weather proof chamber of modest proportions and placed at any desired location with respect to the precipitation-receiving vessel. It is only necessary to connect the fluid column in the vessel with the hydraulic-pressure-responsive means through any convenient conduit, such as a pipe or a hose.

The preferred pressure responsive means for use is a hydraulic bellows. The bellows is constructed of a plurality of single bellows convolutions, the exact number being determined by the precision required of the gauge. Preferably, the bellows and a coil are mounted at opposite ends of a canister such that a magnetic core carried by the distal end of the bellows is aligned for in and out movement with respect to the coil as the bellows expand and contract in response to changes in pressure. The bellows, core, and coil together make up a fluid-pressure-responsive electrical transducer.

DESCRIPTION OF THE DRAWING

In the drawing, which illustrates what is presently contemplated as the best mode of carrying out the invention.

FIG. 1 is a schematic illustration of the precipitation measurement gauge of the invention from a general standpoint;

FIG. 2 is a perspective view of the gauge of FIG. 1 as incorporated in a typical precipitation measurement station located at a remote or not easily accessible site and constructed as a precipitation monitoring system;

FIG. 3 an enlarged vertical section taken on the lines 3—3 of FIGS. 1 and 2 to show internal construction of the transducer unit of the precipitation gauge;

FIG. 4 a transverse vertical section taken along the line 4—4 of FIG. 3; and

FIG. 5 a longitudinal vertical section of an earlier form of the transducer unit.

DESCRIPTION OF THE ILLUSTRATED EMBODIMENT

The schematic showing of FIG. 1 indicates the basic components of the precipitation gauge of the invention and their relationship to one another as a measurement system. A precipitation-receiving vessel 10 is connected to a fluid-pressure-responsive electrical transducer unit 11 by a fluid-flow conduit 12. The transducer 11 is connected to a measurement indicator 13 by an electrical conductor cable 14. The vessel 10, transducer 11, and measurement indicator 13 are normally structurally independent and may be mounted in the field in any desired configuration. The measurement indicator is often remote from the remainder of the system to serve several systems in common. The transducer is normally mounted close to the precipitation-receiving vessel to avoid the necessity of a long hydraulic line connecting the two.

In the measurement station of FIG. 2, the transducer unit 11 and precipitation-receiving vessel 10 are mounted at the top of a triangular structural tower 15. The measurement indicator 13 in this instance is a radio transmitter of standard type housed in a cylindrical canister as illustrated. The canister is advantageously set into a receiving hole 16 in a concrete slab 17, which is poured in an excavation 18 in the earth at the base of the tower 15. The tower is anchored to slab 17 by fasteners 19 embedded therein.

Access to the transmitter 13 is maintained under conditions of deep snow by a protective shield 20, which is conveniently a length of a large diameter conduit. A haulage line 22 extends from attachment to transmitter 13 through and out of the top of shield 20 and around pulley 23 so that the transmitter may be withdrawn for service as required.

Conductor cable 14 connects the transducer unit 11 with the transmitter 13. Conductors 24 connect the transmitter with antenna 25 which is mounted at the top of tower 15. Thus, input information delivered by the transducer 11 to the transmitter 13 is conveniently transmitted, on command, or periodically, to a remote station.

The transducer unit 11, may be mounted in any convenient location on or in the vicinity of tower 15. As illustrated, it is adjustably mounted on a structural member 26 by clamps 27. Thus, the elevation of the canister may be selected to effect a desired pressure input to the unit. In this fashion, calibration of the unit can be accomplished when the precipitation monitoring system is assembled in the field, without adjusting any of the mechanisms in the canister. The transducer unit is connected to the fluid column in the pressure-receiving vessel 10 by conduit 12.

A windshield ring 28 is held in position surrounding the upper end of vessel 10 by structural supports 29. The ring supports a plurality of slats 30. The slats 30, which freely pivot on ring 29, help to prevent snow and ice from bridging over the top of the vessel 10.

The transducer unit illustrated by FIG. 3 includes a hydraulic bellows 31 mounted on an end plate 32a of canister 32. The bellows are mounted by means of a rigid supply conduit 33 which connects to the fluid intake 34 of the bellows 31. The distal end 35 of the bellows 31 carries a magnetic core 36 as a longitudinal extension thereof. Coil 37 is mounted on a movable bulkhead 38 at the end of canister 51 opposite the bellows 31 and in longitudinal alignment with distal end 35 of the bellows 31, so that core 36 moves in and out of coil 37 as bellows 31 expands and contracts, respectively.

The movable bulkhead 38 rides on three locating pins 39 which project through corresponding guide holes 40 (FIG. 4) in bulkhead 38. The bulkhead 38 is held on the pins 39 by adjusting screw 41, which has its slotted head end 42 threaded through the opposite end plate 32b of canister 32 and its opposite end provided with a flange 44. Such flange and the shank of screw 41 rotate freely in the countersunk receiving hole provided therefor in bulkhead 38. Screw 41 is held in place by spool 37, whose flanged end 45 is secured to bulkhead 38 by screws 46 (FIG. 4). Bulkhead 38 can thus be moved either forward or backward with respect to the bellows by turning adjusting screw 41 in the appropriate direction. Such an adjustment is useful to calibrate the transducer unit to the orientation intended for the unit in operation. For example, to maintain a given longitudinal position of the core 36 in the coil 37, the bulkhead will be positioned further forward when the core 36 is oriented vertically upward than when it is oriented vertically downward. A protective cap 47 fits over the projecting end of adjusting screw 41.

Conductors 48 extend through a hole 49 in bulkhead 38 to connect the coil 37 to a receptacle 50 mounted on the end plate 32b. A plug (not shown) is inserted in receptacle 50 to connect the transducer unit 11 to monitoring, recording, or transmitting equipment as desired.

In operation, precipitation vessel 10 is precharged with sufficient anti-freeze to prevent freezing of precipitation accumulating in the vessel during the winter.

The elevation of the transducer unit 11 is adjusted by raising or lowering the unit on member 26 by means of clamps 27 until it provides the desired base input signal to the transmitter unit 13 when a current is passed through the transducer coil 37 (FIG. 3).

When rain or other precipitation accumulates in vessel 10, the hydrostatic pressure at the bottom of the vessel increases. The column of liquid in the vessel 10 is in fluid flow communication with bellows 31 through conduits 12 and 33 (FIG. 3). When the pressure increases in bellows 31 in response to increased hydrostatic pressure in vessel 10, the length of the bellows 31 increases, thereby pushing the magnetic core 36 further into coil 37. The input signal delivered by the transducer coil 37 to the transmitter 13 varies in accordance with the position of the core 36 in the coil 37.

The input signals from the transducer unit may be transmitted to a remote site as raw data. Alternatively, computing equipment may be provided in association with the transmitter to perform translational and/or corrective operations on the input signals prior to transmission. For example, the electronics unit may receive from other weather monitoring devices data concerning the evaporation rate in the vicinity. The local precipitation rate may be computed from these data together with the data supplied by the transducer unit, and a signal proportional to this rate may be transmitted.

FIGURE 5 illustrates an earlier form of the transducer unit with a bellows 52 mounted inside and a coil 53 mounted outside a protective housing 54. A ferrite core 55 extends from attachment to the distal end 56 of the bellows, through a hole 57 in the end wall 58 of the chamber 54 in longitudinal alignment with the hollow core 59 of the coil 53. The base 60 of the housing 54 is provided with a fluid inlet 61 which communicates with the interior of bellows 52 through a passage 67 in the base 60. A standpipe 62 extends vertically from open communication with passage 63 in base 60 and terminates in open communication with the interior of the bellows near the ferrite-carrying end 56 thereof. Thus, air is purged from the bellows by introducing fluid thereto through inlet 61 with valve 64 open to permit the expulsion of air through standpipe 62 and passage 63 and out conduit 65. Valve 64 is closed during operation of the unit. Current is applied to the coil 53 through conductors 66.

Precipitation receiving devices of various types may be substituted for the receiving vessel illustrated. For example, fluid-filled bladders, such as "snow pillows" or equivalent devices useful for measuring the water content of snow, may be connected to the fluid flow conduit 33 (FIG. 3) of the transducer. The pressure in the snow pillow corresponds with the weight of snow accumulating thereon. The hydraulic-pressure-sensitive, variable inductance electrical transducer responds to changes in pressure in the snow pillow in the same manner as it responds to changes in pressure in the illustrated precipitation receiving vessel.

Reference herein to details of certain specific embodiments is not intended to restrict the scope of the claims. The present disclosure will suggest many embodiments of the invention to those skilled in the art.

I claim:

1. A precipitation measuring gauge comprising an open-topped vessel containing an aqueous liquid and adapted to receive precipitation for increasing the hydrostatic pressure of said liquid; hydraulic-pressure-responsive means operably associated with said vessel to receive liquid from said vessel and to respond in proportion to change of hydrostatic pressure in said vessel; a tube filled with said liquid and establishing flow communication between said vessel, at a low level thereof, and said responsive means; an electrical coil mounted in fixed relationship with said pressure-responsive means; a magnetic core for said coil mounted for in and out movement relative to said coil; means coupling said core to said pressure-responsive means for support solely thereby and for movement of said core by said pressure-responsive means in proportion to changes of hydrostatic pressure in said vessel; and indicating means, in circuit with said coil, responsive to variations of position of said core relative to said coil.

2. The gauge of claim 1, wherein the hydraulic-pressure-responsive means comprise hydraulic bellows adapted to receive pressure liquid internally thereof.

3. The gauge of claim 1, wherein the means in circuit with the coil are electrical signalling means.

4. The gauge of claim 1, wherein the hydraulic-pressure-responsive means comprise hydraulic bellows adapted to receive pressure liquid internally thereof; the coil is mounted in longitudinal alignment with the bellows; and the magnetic core is mounted on the bellows in longitudinal alignment with the coil for in and out movement with respect to the coil.

5. The gauge of claim 4, wherein the bellows is vertically positioned with its bottom open to communication with the tube; wherein a second tube leads into the bottom of said bellows and terminates in a standpipe extending to an upper level in said bellows and having an intake opening at its upper end, said second tube having a discharge for air purged from said bellows; and wherein a valve is interposed in said second tube for opening and closing passage therethrough.

References Cited

UNITED STATES PATENTS

| 2,497,759 | 2/1950 | Cappleman | 73—171 |
| 2,642,564 | 6/1953 | Stevens | 73—171 X |
| 2,692,501 | 10/1954 | Erwood | 73—398 |
| 3,068,700 | 12/1962 | Bourns | 73—398 |
| 3,161,059 | 12/1964 | Burggren | 73—398 |
| 1,029,598 | 6/1912 | Davies | 73—301 |

FOREIGN PATENTS 599,149  7/1942  Great Britain.

JERRY W. MYRACLE, Primary Examiner

U.S. Cl. X.R.

73—301